(12) United States Patent
Conroy et al.

(10) Patent No.: US 7,049,353 B2
(45) Date of Patent: May 23, 2006

(54) POLYMER NANOCOMPOSITES AND METHODS OF PREPARATION

(75) Inventors: Jeffrey L. Conroy, Rumford, RI (US); Joseph W. Piche, Raynham, MA (US); Paul J. Glatkowski, Littleton, MA (US); David H. Landis, Barrington, RI (US)

(73) Assignee: Eikos, Inc., Franklin, MA (US)

( * ) Notice: Subject to any disclaimer, the term of this patent is extended or adjusted under 35 U.S.C. 154(b) by 316 days.

(21) Appl. No.: 10/105,618

(22) Filed: Mar. 26, 2002

(65) Prior Publication Data

US 2002/0143094 A1 Oct. 3, 2002

Related U.S. Application Data

(60) Provisional application No. 60/280,453, filed on Apr. 2, 2001.

(51) Int. Cl.
*C08K 9/04* (2006.01)
*C08G 65/00* (2006.01)

(52) U.S. Cl. .................. 523/216; 528/99; 523/206; 427/307; 428/407

(58) Field of Classification Search ............. 528/92, 528/95, 97, 99; 523/216, 206; 427/307; 428/407
See application file for complete search history.

(56) References Cited

U.S. PATENT DOCUMENTS

| | | | | |
|---|---|---|---|---|
| 4,810,734 A | * | 3/1989 | Kawasumi et al. | ......... 523/216 |
| 5,003,078 A | * | 3/1991 | Keller | .......... 548/406 |
| 5,292,854 A | | 3/1994 | Keller | |
| 5,719,223 A | * | 2/1998 | Karg | .......... 524/445 |
| 5,849,830 A | | 12/1998 | Tsipursky et al. | |
| 5,939,508 A | | 8/1999 | Keller | |
| 6,057,035 A | * | 5/2000 | Singh et al. | ......... 428/403 |
| 6,124,365 A | | 9/2000 | Lan et al. | |
| 6,323,270 B1 | * | 11/2001 | Ishida | .......... 524/445 |
| 2001/0056136 A1 | * | 12/2001 | Hasegawa et al. | |

* cited by examiner

*Primary Examiner*—Tae H. Yoon
(74) *Attorney, Agent, or Firm*—Powell Goldstein LLP (57) ABSTRACT

High-use temperature, lightweight polymer/inorganic nanocomposite materials are described having enhanced thermal stability and performance characteristics. These materials are made possible by new methods for synthesizing composite materials that enhance the thermal stability of the nanocomposite systems from 100–150° C. to over 450° C. These materials and techniques for their formation are enabled at least in part by the use of polar organic phthalonitrile monomers and oligomers that can exfoliate layered phyllosilicates, such as smectite clays, in percentages greater than 10% inorganic by weight. This approach offers a solvent-free direct melt intercalation technique that greatly reduces the cost of processing nanocomposites. Additionally, the use of unmodified phyllosilicates overcomes temperature limitations of prior art, which uses organically-modified layered silicates. The new technology provides hitherto unobtainable thermal stability and performance characteristics, and has numerous applications in the automotive, aerospace, electronic and marine industries.

27 Claims, 4 Drawing Sheets

POLYMER NANOCOMPOSITES AND METHODS OF PREPARATION

REFERENCE TO RELATED APPLICATIONS

This application claims priority to U.S. Provisional Application No. 60/280,453 entitled "Polymer Nanocomposites and Methods for the Preparation Thereof" filed Apr. 2, 2001.

BACKGROUND OF THE INVENTION

1. Field of the Invention

The invention relates generally to polymer nanocomposites and methods for their preparation. The invention relates more specifically to the use of polymers and monomers that contain polar groups such as nitrile that can exfoliate layered inorganic materials such as layered silicates and optionally form thermally stable matrices with such materials.

2. Background

Advanced materials, particularly in the automotive and aerospace fields are needed that can withstand high temperatures. In response to this need a variety of compositions termed "nanocomposites" have been designed, as for example described in U.S. Pat. Nos. 6,323,270, 5,385,776 and 6,057,035. Nanocomposites generally are admixtures of individual platelet particles derived from intercalated layered silicate materials with one or more polymers. The admixture usually comprises a polymer matrix having one or more properties of the matrix polymer that is improved by addition of the exfoliated intercalate. The intercalate may be formed by increasing the interlayer spacing between adjacent silicate platelets. The increased spacing is achieved by adsorption of a silane coupling agent or an onium cation, such as a quaternary ammonium compound, having a reactive group which is compatible with the matrix polymer.

Phyllosilicates, such as smectite clays (e.g., sodium montmorillonite and calcium montmorillonite), can be treated to intercalate organic molecules between silicate layers. Furthermore, the organic molecules may be bonded to polymer between the layers, thereby substantially increasing the interlayer (interlaminar) spacing between the adjacent silicate layers. The treated, intercalated phyllosilicates, having interlayer spacings of at least about 10–20 Å and often up to about 100 Å, can then be exfoliated, (i.e. separate the silicate layers). This separation may be accomplished mechanically, such as by high shear mixing. Admixing individual silicate layers with a matrix polymer, before, after or during the polymerization of the polymer, can greatly contribute to one or more desirable polymer properties such as high mechanical strength and stability to high temperature, as described for example in U.S. Pat. Nos. 4,739,007; 4,810,734; and 5,385,776.

Exemplary known composites, also called "nanocomposites," are disclosed in the published PCT disclosure of Allied Signal, Inc. WO 93/04118 and U.S. Pat. No. 5,385,776. These publications disclose admixtures of individual platelet particles derived from intercalated layered silicate materials with a polymer to form a polymer matrix having one or more properties of the matrix polymer and improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group that is compatible with the matrix polymer. Such quaternary ammonium cations are well-known to convert a highly hydrophilic clay, such as sodium or calcium montmorillonite, into an organophilic clay capable of sorbing organic molecules.

Nanocomposites may be formed by direct intercalation of polystyrene and poly(ethylene oxide) in organically modified silicates with a solvent as described by R. A. Vaia, et al., *Chem. Mater.*, 5:1694–1696 (1993) and R. A. Vaja et al. *Adv. Materials*, 7:154–156 (1985). This intercalation may be accompanied by water displacement from between the clay platelets. Unfortunately however, the intercalated material reported in these studies was not easily exfoliated but was tested in pellet form.

More recently, higher temperature inorganic nanocomposites have been described, as explained in U.S. Pat. No. 6,057,035 issued to Singh and Haghighat. Although apparently an improvement, the use of synthetic organically modified layered silicates described in this patent generally remains limited, in most instances to temperatures well below 400 degrees centigrade and may require synthesis of a new type of alkyl group compatibility agent. A better solution would exploit known chemistry for making high temperature nanocomposites.

Presently phthalonitrile resins often are used with alternative curing agents to address the need for high temperature composites as described for example in U.S. Pat. Nos. 5,292,854 and 4,408,035. While these resins offer high-use temperatures and good fire resistance, their widespread use is restricted by microcrack formation and poor long-term thermo-oxidative stability. Both of these problems compromise mechanical properties of these materials and limit their use. These problems are alleviated by blending the resin with a conventional thermoset resin(s) such as an epoxy or imide. Unfortunately however, while this blending toughens the phthalonitrile resin this is accompanied by lower temperature stability compared to resins made from the neat phthalonitrile systems, as described in U.S. Pat. Nos. 5,939,508 and 5,132,396. Accordingly, improved materials having higher temperature resistance with good mechanical strength are needed. In particular, methods are required for reducing microcracking and increasing material thermooxidative stability, while retaining the inherent low viscosity and processability of the systems such as those made from phthalonitrile.

SUMMARY OF THE INVENTION

Embodiments of the invention provide high-use temperature, lightweight polymer/inorganic nanocomposite materials with enhanced thermal stability and performance characteristics. In an embodiment a nanocomposite system with enhanced thermal stability is provided with temperature resistance well over 100–150° C. to over 400° C.

One embodiment of the invention is directed to methods for preparing a nanocomposite from a polymerizable chemical and an inorganic material, comprising: dissolving a polymerizable chemical that contains nitrile groups, preferably by heating or by applying a solvent which may or may not include a catalyst, mixing the inorganic material with the dissolved polymerizable chemical; and catalyzing the polymerizable chemical in the mixture to prepare the nanocomposite.

Another embodiment is a method for preparing smectite clay for use in making a nanocomposite, the method comprising the step of mixing a a polymerizable chemical that contains nitrile groups with the smectite clay prior to use of the smectite.

Another embodiment is a method for preparing smectite clay for use in making a nanocomposite, the method comprising the step of mixing a polymerizable chemical that contains nitrile groups with the smectite clay, and contacting the treated smectite clay with a solvent. In yet another embodiment a matrix material is further added to the treated smectite. In another embodiment the matrix material may comprise polycarbonate, Nylon, an olefin, a polyamide, a polyether imide, a polyimide, a polyarylene ether, an epoxy, a urethane, a phenolic resin, a ceramic, or a combination thereof.

Another embodiment an improved method is provided for exfoliating clays for the preparation of nanocomposites, comprising replacing an alkyl amine within the clay with an organic nitrile containing agent. Yet another embodiment of the invention is a method for preparing smectite clay for making a nanocomposite, the method comprising the step of mixing a a polymerizable chemical that contains nitrile groups with the smectite clay prior to use of the smectite.

Other embodiments will be appreciated by a skilled artisan upon reading this disclosure.

DESCRIPTION OF THE DRAWINGS

For a more complete understanding of the present invention and the objects and advantages thereof, reference is made to the following description and accompanying drawings in which.

The following definitions are provided to help clarify language used to understand embodiments and are not meant to narrow the regular dictionary meanings of the words used.

"Layered material" means an inorganic material, such as a smectite clay mineral, that is in the form of a plurality of adjacent, bound layers.

"Platelets" means individual layers of the layered material.

"Intercalate" or "intercalated" means a layered material that includes one or more monomeric ester and/or monomeric ether molecules disposed between adjacent platelets of the layered material to increase the interlayer spacing between the adjacent platelets.

"Intercalation" means a process for forming an intercalate.

"Intercalant monomer" or "intercalant" means a molecule that is adsorbed between platelets of the layered material and complexes with the platelet surfaces to form an intercalate.

"Intercalating carrier" means a carrier comprising water with or without an organic solvent used together with an intercalant monomer to form an intercalating composition capable of achieving intercalation of the layered material.

"Exfoliate" or "exfoliated" means individual platelets of an intercalated layered material so that adjacent platelets of the intercalated layered material can be dispersed individually throughout a carrier material, such as water, a polymer, an alcohol or glycol, or other organic solvent.

"Exfoliation" means a process for forming an exfoliate from an intercalate.

DESCRIPTION OF THE INVENTION

It was surprisingly discovered that adding a monomer having a nitrile group to hydrophilic layered silicates such as phyllosilicates leads to layer separation and even to their exfoliation. For example, phthalonitrile monomers added to montmorillonite clay led to the exfoliation of the clay. It was further discovered that the added monomers could be polymerized to form a very strong and high temperature resistant nanocomposite with a wide range of uses. These discoveries in turn led to several new and useful applications.

In one embodiment a clay may be partially intercalated or completely exfoliated by mixing the clay with an organic molecule of molecular weight preferably between 500 and 1,000,000 and more preferably between 1000 and 100,000 daltons, such as a monomer having a hydrophobic chemical tendency as well as a nitrile group. A specific example of a suitable organic molecule is a phthalonitrile monomer. In this embodiment the intercalated or exfoliated particles generated may be used directly by mixing with a medium or the adsorbed nitrile group containing organic constituents may be polymerized. In yet another embodiment one or more other substances are added and the adsorbed nitrile group containing constituents are polymerized.

Advantageously, polar organic phthalonitrile monomers and oligomers may be combined to form exfoliate layered phyllosilicates, such as smectite clays, in percentages greater than 10% inorganic mass. This approach offers a solvent-free direct melt intercalation technique which greatly reduces the cost of processing these nanocomposites. Additionally, the use of unmodified phyllosilicates overcomes the temperature limitations of prior art which uses organically-modified layered silicates. Thus, this embodiment provides hitherto unobtainable thermal stability and performance characteristics, and has numerous applications in automotive, aerospace, electronic and marine industries.

It was surprisingly discovered that a phyllosilicate, such as a smectite clay, can be intercalated sufficiently for subsequent exfoliation by sorption of a wide variety of organic monomer compounds that have an ether and/or an ester functionality to provide bonding of ethers, esters and/or co-polymers to the internal surfaces of the layered material. Without wishing to be bound by any one theory of this embodiment of the invention, it is believed that complexing occurs by a mechanism such as, for example, ionic complexing; electrostatic complexing; chelation; hydrogen bonding; dipole/dipole; Van Der Waals forces; and any combination thereof. Such bonding between two functional groups of one or two intercalant monomer molecules and the metal cations bonded to the inner surfaces of the phyllosilicate platelets, it is believed, provides adherence between the ester, ether or co-polymer molecules and the platelet inner surfaces of the layered material.

Intercalation and exfoliation Without wishing to be bound by any one theory of embodiments of the invention, the adsorption and bonding of a platelet metal cation between two oxygen atoms of the intercalant monomer molecules is believed to increase the interlayer spacing between adjacent silicate platelets or other layered material. The increase typically is at least about 5, 10, 20 30 to 45 or even more than 45 angstroms. This increase in interlayer spacing presents itself as intercalation and exfoliation of the clay. The intercalated phyllosilicates easily can be exfoliated into individual phyllosilicate platelets before or during admixture with a liquid carrier or solvent. For example, one or more monohydric alcohols, such as methanol, ethanol, propanol, and/or butanol; polyhydric alcohols, such as glycerols and glycols, e.g., ethylene glycol, propylene glycol, butylene glycol, glycerine and mixtures thereof; aldehydes; ketones; carboxylic acids; amines; amides; and other organic solvents may be used to deliver the solvent in a thixotropic composition, or for delivery of any active hydrophobic or hydrophilic organic compound, such as a topically active pharmaceutical, dissolved or dispersed in the carrier or solvent, in a thixotropic composition. The intercalates and/or exfoliates thereof can be admixed with a polymer, co-polymer or other organic monomer compound(s) or composition to increase the viscosity of the organic compound or provide a polymer/intercalate and/or exfoliate composition to enhance one or more properties of a matrix polymer.

The intercalation properties and exfoliant properties of certain materials are profitably used for a wide range of nanocomposites. In some embodiments the intercalant itself becomes polymerized. In other embodiments one or more separate polymers (or polymer precursors) are added after intercalation. In yet another embodiment the intercalant is used in place of previously used alkyl amines or other intercalants.

Nanocomposites A generally accepted working definition for inorganic-organic nanocomposites is a composite in which the inorganic phase is no larger than 1 micron in size, and the organic (polymeric) phase is continuous; that is, nanocomposites are highly dispersed systems of submicron-sized inorganic particles in a polymeric matrix. Such nanocomposites are not to be confused with ordinary composites of an unmodified clay (i.e., a clay in its natural state), such as mica or talc, and a polymer, where the clay simply acts as a filler for economic reasons, with negligible impact on physical properties. Modified layered clays also can be used for other purposes, such as thickeners for greases and polyester laminating resins and are available from suppliers such as Rheox, Inc., or Southern Clay Products.

Figure 1:
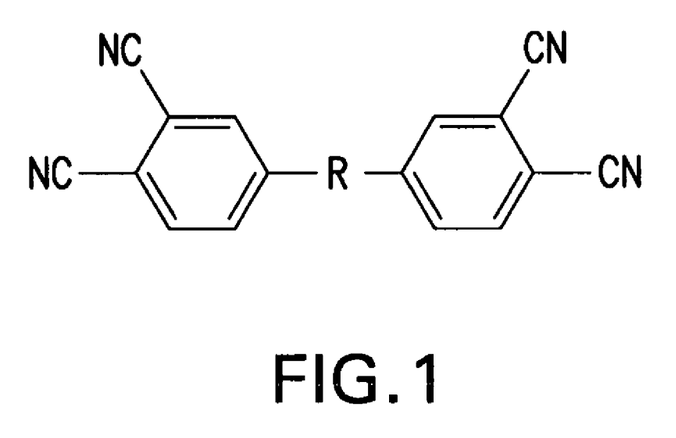
FIG. 1 shows the chemical structure of phthalonitrile monomers and oligomers according to one embodiment of the present invention.

A wide variety of polymer nanocomposites may be prepared that comprise a variety of inorganic phases. A wide variety of ceramics, and in particular scintered and layered ceramics are available for routine optimization and use in embodiments of the invention. U.S. Pat. Nos. 6,306,517; 6,349,026; 6,264,710; 6,243,254; 6,241,838; 5,993,722; 6,180,184; 5,874,175 and 5,834,108, for example, describe ceramic layers and ceramic powder that may be used in embodiments of the invention. In particular, layered phyllosilicates, such as smectite clay with a phthalonitrile monomer or oligomer are useful wherein the phthalonitrile intercalates and/or exfoliates the clay. FIG. 1 shows a phthalonitrile structure that is representative of monomers and oligomers useful for practice of embodiments of the invention. See also, for example monomers and oligomers described in U.S. Pat. Nos. 5,132,396; 5,159,054; 4,409, 382; 4,234,712; and 3,956,320.

Inorganic-organic nanocomposites often exhibit properties exceeding those of macroscopic composites. Typically, the inorganic component is a modified clay and the organic component is a polymer. For example, nanocomposites made from alkyl quaternary ammonium modified bentonite clays and polyamides possess higher heat deflection temperature, greater toughness, and reduced moisture permeability, making them useful in automotive timing belts. Exemplary disclosures of nanocomposites include U.S. Pat. No. 4,810,734 to Kawasumi et al.; U.S. Pat. No. 4,889,885 to Usuki et al.; U.S. Pat. No. 4,894,411 to Okada et al.; and U.S. Pat. No. 5,385,776 to Maxfield et al.

A modified clay is derived from a naturally occurring layered clay (e.g., bentonite or hectorite) in which negatively-charged layered structures, or sheets, are held together by sodium, potassium, magnesium or other inorganic cations sitting in anionic galleries between the sheets. A further layered structure may exist within each sheet. For example, silicate clays are characterized by a center layer of aluminum and magnesium hydroxides fused between two layers of silica. The sheet-to-sheet separation (or interlayer distance) is on the order of 15 Å.

A layered clay in this natural state is less suitable for preparing nanocomposites because it is too hydrophilic and the layers are held together too tightly by the inorganic cations to interact with the hydrophobic polymer molecules and be dispersed thereby. To make the layered clay more polymer-compatible, the clay is modified by replacing the inorganic cations with organic cations, with the resulting product being referred to as a "modified layered clay," or an "organoclay." Commonly, the organic cation is a quaternary ammonium cation. The replacement generally increases the interlayer distance to 25 Å or more, reduces the interlayer forces, and makes the clay more hydrophobic, rendering it amenable to dispersion in a polymer. In an embodiment of the invention a nitrile group containing organic molecule is used as an intercalant in place of the cation. In another embodiment this intercalant itself participates in polymerization reactions.

Preparation of nanocomposites In one method, a nanocomposite is prepared by dispersing the modified layered clay in a polymerizable liquid monomer followed by polymerization of the liquid monomer in the presence of the modified layered clay. Polymerization may be effected by UV light, acid, base, or heat, and the polymerization temperature typically is below 200° C., and is necessarily below 250° C., to avoid decomposition of the modified layered clay in many instances. In other instances as shown in previous work by others, the polymer is produced from a liquid monomer.

Alternatively, a nanocomposite may be prepared by melt blending a modified layered clay with a polymer. In this case, the modified layered clay needs to be stable at the melt processing temperature of the polymer. Hitherto, it has not been feasible to make a modified layered clay nanocomposite with a melt processed polymer such as a crystalline thermoplastic having high crystalline melting temperature (e.g., a fluoroplastic) or an amorphous polymer having a high glass transition temperature, because a conventional quaternary ammonium cation modified layered clay is stable only up to about 250° C. In an embodiment of the invention a conventionally used quaternary ammonium cation is replaced with phthalonitrile monomer.

Another method of preparing layered silicate-epoxy nanocomposites is disclosed in U.S. Pat. No. 5,554,670 to Giannelis. In accordance with the method disclosed in U.S. Pat. No. 5,554,670, a smectite-type clay is first contacted with an organic compound containing alkylammonium ions having functional groups which are reactive to epoxy resin molecules. The clay layers is then attached directly to the polymer network by ion-exchange and molecularly dispersed in the matrix. The nanocomposites disclosed in U.S. Pat. No. 5,554,670 exhibit a slightly increased glass transition temperature. The dynamic storage modulus of the nanocomposite was considerably higher in the glassy region and greatly higher in the rubbery region when compared with such modulus in the pristine matrix. This method too may be improved by replacing the alkyl ammonium ions with intercalants as described herein.

Organic nitrite opened clay In certain embodiments of the invention, treatment of clay with an organic nitrile opens up the clay for subsequent mixing with one or more other polymers that may enhance a desirable characteristic such as fire retardency, impermeability to gases, lower cost, mechanical improvements and the like. A polymer useful in this context may be for example, a polycarbonate, Nylon, an olefin, a polyamide, a polyether imide, a polyimide, a polyarylene ether, an epoxy, a urethane, a phenolic resin, or a combination of polymers.

Advantageously one or more monomers may be added and polymerized in the presence of the intercalated or exfoliated clay particles. Embodiments of the invention include intercalated layered materials and exfoliated solutions thereof, prepared by intercalation of polymerizable phthalonitrile monomers, oligomers, polymers or co-polymers between the planar layers of a swellable layered material, such as a phyllosilicate, and preferably a smectite clay. Treatment of such swellable layered materials by an organic nitrile was found to expand the spacing of adjacent layers of the layered materials to at least about 10 Å or even greater than 100 Å.

Intercalates of embodiments can be made to disperse uniformly into any desired monomers, oligomers, and/or polymer or co-polymer matrix or host materials to form exfoliated polymer-clay nanocomposites. In particular, for the thermoset resins, the intercalates can be dispersed in a monomer and cured with curing agents. Also, curing agents can be directly incorporated into the intercalate and cured together with the polymerization of an intercalant monomer in situ, which has been intercalated into the clay interlayer galleries. If a monomer or oligomer intercalant is intercalated into the clay galleries, the intercalant can be polymerized together with a desired monomer, oligomer, polymer or co-polymer matrix material, and the combination then can be compounded to form the nanocomposite.

Use monomeric compounds to intercalate, exfoliate and form polymer Most advantageous results are obtained using a monomeric organic compound, having at least one ether or ester functionality, and in a concentration of at least about 2%, preferably at least about 5% by weight, more preferably at least about 10% by weight, more preferably at least about 20% and most preferably about 30% to about 80% by weight, based on the weight of functional monomeric organic compound and carrier. A carrier such as water, with or without another solvent for the functional monomeric compound may be used to achieve better sorption of the functional monomeric organic compound between phyllosilicate platelets.

Regardless of the concentration of functional monomeric organic compound in aqueous liquid, a desirable intercalating composition may have a monomeric ether and/or ester to layered material ratio of at least 1:20, preferably at least 1:10, more preferably at least 1:5, and most preferably about 1:4 to achieve efficient intercalation of the functional monomeric organic compound between adjacent platelets of the layered material. The functional monomeric organic compound sorbed between and bonded to the silicate platelets (possibly via chelation-type bonding with the exchangeable cation, or like electrostatic or dipole/dipole bonding), causes separation or added spacing between adjacent silicate platelets.

In embodiments, the organic compound, such as an organic phthalonitrile compound is derivatized to include one or more aliphatic, amine, hydroxyl, and/or polymerizable organic groups.

For simplicity of description, both the esters and ethers herein are termed the "intercalant" or "intercalant monomer" or "monomer intercalant". In this manner, the esters and/or ethers will be sorbed sufficiently to increase the interlayer spacing of the phyllosilicate in the range of about 5 angstroms to about 100 angstroms, preferably at least about 10 angstroms, for easier and more complete exfoliation, in a commercially viable process, regardless of the particular phyllosilicate or intercalant monomer.

Referring to FIG. 1, phthalonitrile resins of the type in FIG. 1 can be melted according to an embodiment of the invention to intercalate and exfoliate layered phyllosilicates and thus yield extremely thermally-stable nanocomposites that retain the processability inherent to these systems. Furthermore, the layered phyllosilicates can be exfoliated in much higher proportions than those reported for previous thermosets because of the phthalonitriles' inherently low molecular weight and high polarity. In addition, due to this polarity, the use of unmodified clays is enabled to avoid the problems inherent in treating a layered phyllosilicate with an organic compatiblizer, such as an alkylammonium salt, phosphonium salt, or other organic moiety having an inherently lower thermal stability than the phthalonitrile systems. Such phthalonitrile systems are compatible with other systems, including epoxies and polyimides. These high clay volume intercalates may be used as additives to these systems to both raise the thermal performance and impart the mechanical improvements concurrent with layered phyllosilicate exfoliation in a polymer matrix.

Most advantageously, the phthalonitrile monomer bis(3,4,-dicyanophenoxy)4,4'-biphenyl is melted, and between 1% to 5%, preferably 5% to 20%, and more preferably about 10% sodium montmorillonite clay is added and stirred at 260° C. The resulting solution can be kept at temperature for some period of time without catalyzing the phthalonitrile cure reaction, or increasing the viscosity above the limit for RTM type processing (>1000 cps). The remelting power, or intercalated melt, may be catalyzed by adding a high temperature amine, in this case bis[4-(4-aminophenoxy)phenyl] sulfone, at 5% by weight of phthalonitrile resin. The resulting mixture preferably is cured at a temperature of at least 150° C. for at least 2 or 3 hours or at a temperature of at least 300° C. for 1 or 2 hours, followed by post-cure at 350° C. for 3 or 4 hours although higher or lower temperatures and increased or decreased times may be used depending on other conditions such as the type of monomer used, the presence of oxygen and pressure during the heating.

Figure 2:
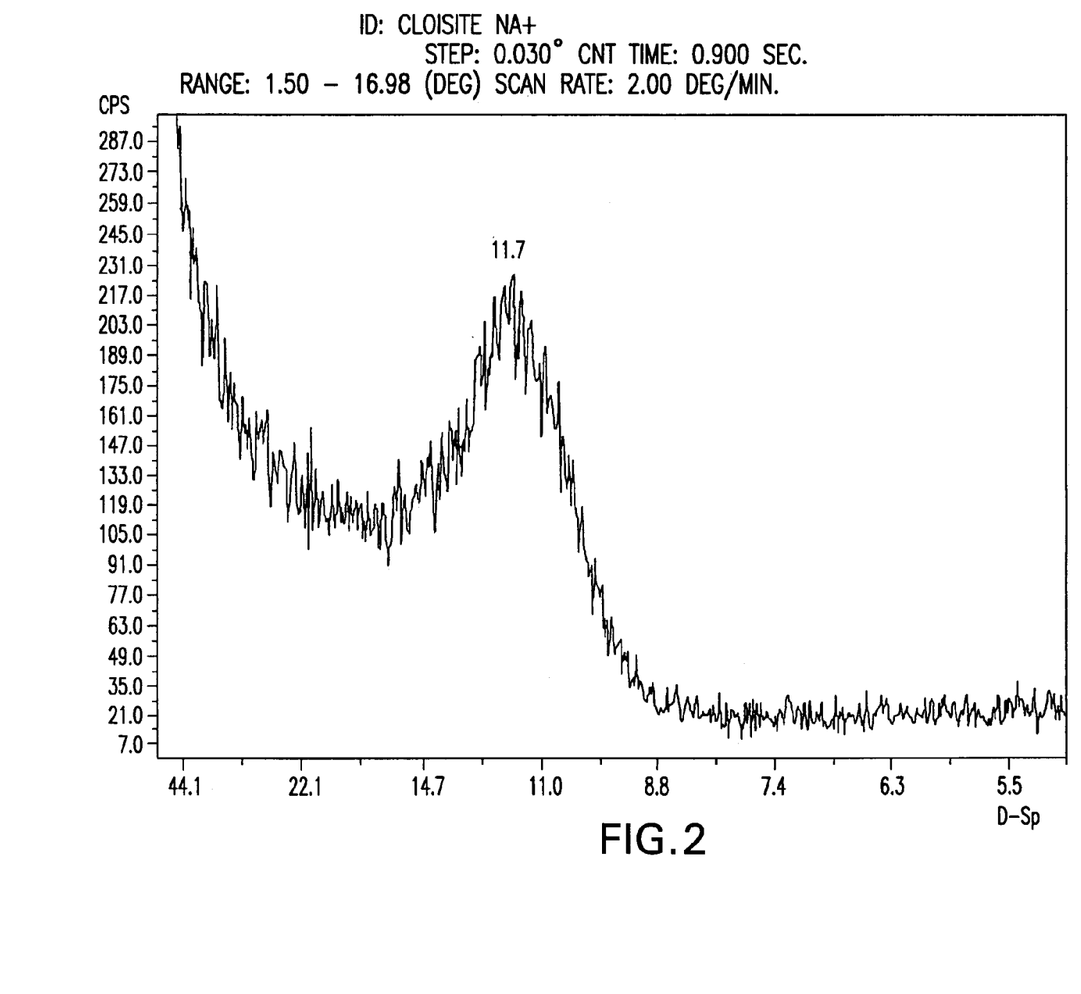
FIG. 2 shows the X-ray diffraction pattern of sodium montmorillonite clay according to one embodiment of the present invention.
Figure 3:
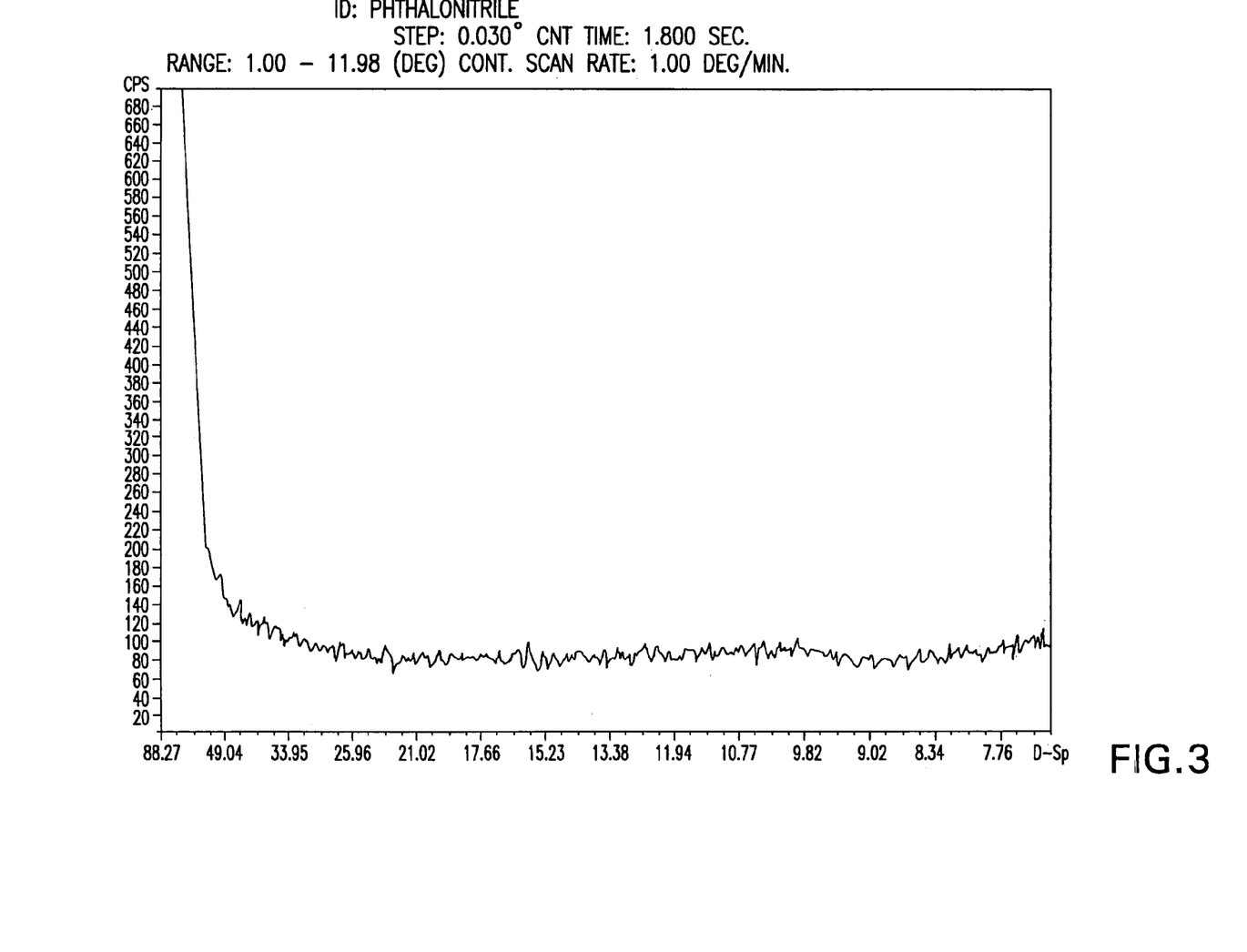
FIG. 3 shows the X-ray diffraction pattern of a 10% sodium montmorillonite clay phthalonitrile nanocomposite according to one embodiment of the present invention.
Figure 4:
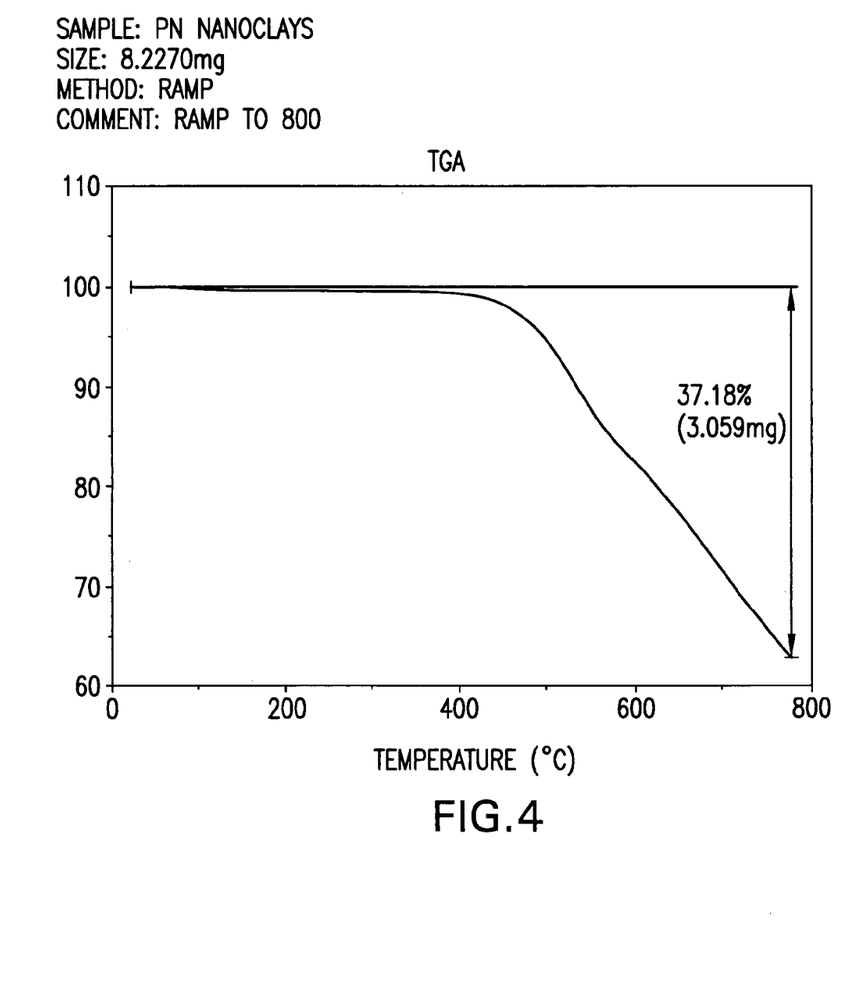
FIG. 4 shows a thermogravimetric analysis of the 10% sodium montmorillonite clay phthalonitrile nanocomposite according to one embodiment of the present invention.

FIG. 2 shows the X-ray diffraction pattern of sodium montmorillonite clay prepared according to an embodiment of the invention. This peak reveals the crystalline layered phyllosilicate structure. FIG. 3 shows the X-ray diffraction pattern of a 10% sodium montmorillonite clay phthalonitrile nanocomposite. The lack of peaks in this figure shows that the structure of the crystalline layered phyllosilicate has been disrupted by the intercalation and exfoliation of the phthalonitirle monomer and the subsequent polymer. FIG. 4 shows the thermogravimetric analysis of the 10% sodium montmorillonite clay phthalonitrile nanocomposite, with enhanced thermal stability compared to the neat resin without the exfoliated clay.

Phthalonitrile polymers Phthalonitrile polymers are particularly useful in embodiments of the invention because of their heat resistance. Advantageously, a useful method for preparing polymer nanocomposites includes (1) dissolving, preferably by melting or applying a solvent, one or more a phthalonitrile monomers; (2) mixing a clay with the phthalonitrile monomer(s); (3) catalyzing the mixture with a high-temperature amine; and (4) curing the mixture. The phthalonitrile monomer may be for example, a bis(3,4,-dicyanophenoxy)4,4'-biphenyl, a bis(3,4,-dicyanophenoxy)4,4'-biphenyl having at least one aliphatic group, a bis(3,4,-dicyanophenoxy)4,4'-biphenyl having at least one amine group, and a bis(3,4,-dicyanophenoxy)4,4'-biphenyl having at least one hydroxyl group. Other structures containing these and other functional groups may be used and are available to the skilled artisan.

The clay advantageously may be any hydrophilic silicate such as for example, sodium montmorillonite. The monomer may be mixed at a ratio of between 1 to 50 percent wgt/wgt with the clay with the phthalonitrile monomer and in desirable embodiments is mixed at a ratio of between 5% and 20% with the clay. The high-temperature amine may be bis[4-(4-aminophenoxy)phenyl]sulfone, at (for example), between 0.5% and 20% by weight and more preferably at about 5% by weight of phthalonitrile resin.

This embodiment is particularly advantageous for improving high temperature resistance and increasing the strength of materials, which generally is made possible by polymerizing the nitrile group containing organic. In this case the nitrile group has two functions. The first function is to act as a ligand for interacting with the clay plate polynegative surfaces and assist intercalation and exfoliation. The second function is to act as a functional residue that can react to form a crosslink.

Replace alkyl amine with an organic nitrite containing agent In an embodiment, a charged compatibility agent such as an alkyl amine is replaced with a nitrile containing agent such as a phthalonitrile monomer. In this embodiment the nitrile residue, while not acting as a fully charged group, facilitates intercalation and even exfoliation. While not wishing to be bound by any one theory of this embodiment of the invention, it is believed that multiple nitrites are attracted to the multiple negative charges on the smectic clay, and the presence of a large bulky hydrophobic portion helps push the parallel plates apart. Later, many of the nitrites optionally are destroyed by crosslinking reactions. In other embodiments, at least 50%, 75%, 85%, 90%, 95% or even more than 98% of the nitrites are removed by participation in cross linking reactions. In still other embodiments, the nitrites remain and other material(s) are added to form a matrix without crosslinking via the nitrites.

In an advantageous embodiment the alkyl amine, which intercalates and exfoliates clay particles, is replaced with a substance that has a nitrile group. According to embodiments, previously developed methods and compositions that utilize alkyl amine treatment of clay to intercalate or exfoliate may be improved by replacing the alkyl amine with an organic that has one or more nitrile groups. Previous techniques and components that are improved by this embodiment include, for example, those disclosed in U.S. Pat. Nos. 6,225,394; 6,084,019; 6,071,988; 6,057,396; 5,994,445; 5,981,029; 5,910,523; 5,880,197; 5,877,248; 5,853,886; 5,849,830; 5,844,032 and 5,837,763.

Add other polymers Previous attempts have been made to intercalate polyvinylpyrrolidone (PVP), polyvinyl alcohol (PVA) and poly(ethylene oxide) (PEO) between montmorillonite clay platelets with little success. As described in Levy, et al., Interlayer Adsorption of Polyvinylpyrrolidone on Montmorillonite, Journal of Colloid and Interface Science, Vol. 50, No. 3, March 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 angstroms). Only the sodium montmorillonite had expanded beyond a 20 angstroms basal spacing (e.g., 26 angstroms and 32 angstroms), at 5.sup.+ % H.sub.2 O, after contact with the PVP/ethanol/H.sub.2 O solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, Adsorption of Polyvinyl Alcohols by Montmorillonite, Journal of Colloid Sciences, Vol. 18, pages 647–664 (1963), polyvinyl alcohols containing 12% residual acetyl groups could increase the basal spacing by only about 10 angstroms due to the sorbed polyvinyl alcohol (PVA). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In contrast, the materials described herein generally intercalates more effectively and provides improved nanocomposites. However, the various materials studied by others and described in references cited herein often may be improved by use of advantageous intercalants of embodiments of the invention. In general, other materials such as PVP, PVA and PEO may be combined with solid phases such as clays after the solid phases have been intercalated or exfoliated by one or more substances such as a nitrile containing organic compound.

Thermally stable nanocomposites comprising alternating organic layers and inorganic layers with thermally stable phthalonitrile compatibility agents produced by the methods described here are particularly advantageous as gas barriers and for flame retardant structures. Such materials may be formed readily into films, fibers, insulator sleeves, extruded components and molded components for a wide variety of consumer, commercial and military applications.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated herein by reference. It is intended that the specification and examples be considered exemplary only, with the true scope and spirit of the invention indicated by the following claims.

What is claimed is:

1. A method for preparing a nanocomposite comprising:
dissolving a phthalonitrile monomer;
mixing an inorganic material with the dissolved phthalonitrile monomer forming a mixture;
polymerizing the phthalonitrile monomer in the mixture to form a polymerized mixture; and
adding the polymerized mixture to a thermoplastic polymer to prepare the nanocomposite.

2. The method of claim 1 wherein the phthalonitrile monomer is selected from the group consisting of bis(3,4,- dicyanophenoxy)4,4'-biphenyl, a bis(3,4,-dicyanophenoxy) 4,4'-biphenyl having at least one aliphatic group, a bis(3,4,-dicyanophenoxy)4,4'-biphenyl having at least one amine group, a bis(3,4,-dicyanophenoxy)4,4'-biphenyl having at least one hydroxyl group, and combinations thereof.

3. The method of claim 1 wherein the inorganic material is a hydrophilic silicate.

4. The method of claim 3 wherein the hydrophilic silicate is selected from the group consisting of a layered mica, a clay, a phyllosilicate, a sodium montmorillonite clay, a smectite clay, and combinations thereof.

5. The method of claim 1 wherein the step of dissolving the phthalonitrile monomer comprises melting with heat.

6. The method of claim 1 wherein the step of dissolving comprises contacting the phthalonitrile monomer with a chemical solvent.

7. The method of claim 1 wherein the step of polymerizing comprises adding heat, adding a catalyst, or both heat and a catalyst to the mixture.

8. The method of claim 1 wherein the step of polymerizing comprises adding a high-temperature amine.

9. The method of claim 8 wherein the high-temperature amine is [4-(4-aminophenoxy)phenyl]sulfone.

10. The method of claim 1 wherein the inorganic material is mixed at a ratio of between 0.1% to 40% wgt/wgt with the phthalonitrile monomer.

11. The method of claim 1 further comprising a high temperature curing step after the polymerization step.

12. The method of claim 11 wherein the high temperature curing step comprises heating the mixture to at least 250° C. for at least one hour.

13. The method of claim 11 wherein the high temperature curing step comprises heating the mixture to at least 300° C. for at least one hour.

14. The method of claim 1 wherein the thermoplastic polymer is selected from the group consisting of polycarbonate, Nylon, a polyamide, a polyether imide, a polyimide, a polyarylene ether, and combinations thereof.

15. The method of claim 1 further comprising contacting the inorganic material with solvent prior to mixing the inorganic material with the melted phthalonitrile monomer.

16. The method of claim 1 wherein a matrix material comprising a thermoset polymer is added prior to, during or after mixing the inorganic material with the melted phthalonitrile monomer.

17. The method of claim 16 wherein the thermoset polymer is selected from the group consisting of an epoxy, a urethane, a phenolic resin, and mixtures thereof.

18. A nanocomposite prepared by the method of claim 1.

19. A method for preparing smectite clay for making a nanocomposite, said method comprising:
the step of mixing a chemical that contains nitrile-groups with said smectite clay to form a mixture;
polymerizing the chemical in the mixture to form a polymerized mixture; and
adding the polymerized mixture to a thermoplastic polymer wherein the chemical that contains nitrile groups is melted prior to mixing with the smectite clay.

20. The method of claim 19 wherein the chemical that contains nitrile groups is a phthalonitrile monomer or phthalonitrile oligomer.

21. The method of claim 20 further comprising the step of contacting the treated smectite clay with a solvent.

22. The method of claim 20 further comprising the step of adding a matrix material.

23. The method of claim 22 wherein the matrix material is selected from the group consisting of ceramics, epoxys, Nylon, olefins, phenolic resins, polyamides, polyarylene ethers, polycarbonates, polyimides, polyether imides, urethanes, and combinations thereof.

24. The method of claim 20 further comprising the step of curing the mixture at a temperature of at least about 150° C. for at least two hours.

25. The method of claim 20 further comprising the step of curing the mixture at a temperature of at least about 300° C. for at least two hours.

26. The method of claim 20 further comprising the step of post curing the mixture at a temperature of at least about 350° C. for at least two hours.

27. A method for preparing a nanocomposite comprising:
dissolving a phthalonitrile monomer;
mixing a hydrophilic silicate with the dissolved phthalonitrile monomer forming a mixture;
polymerizing the phthalonitrile monomer in the mixture to form a polymerized mixture; and
adding the polymerized mixture to a thermoplastic polymer to prepare the nanocomposite.

* * * * *